(12) United States Patent
Jeong

(10) Patent No.: US 10,050,255 B2
(45) Date of Patent: Aug. 14, 2018

(54) RECHARGEABLE BATTERY AND METHOD OF MANUFACTURING THE SAME

(71) Applicants: SAMSUNG SDI CO., LTD., Yongin-si, Gyeonggi-do (KR); ROBERT BOSCH GMBH, Stuttgart (DE)

(72) Inventor: Dong-Ho Jeong, Yongin-si (KR)

(73) Assignees: SAMSUNG SDI CO., LTD., Yongin-si, Gyeonggi-do (KR); ROBERT BOSCH GmbH, Stuttgart (DE)

( * ) Notice: Subject to any disclaimer, the term of this patent is extended or adjusted under 35 U.S.C. 154(b) by 224 days.

(21) Appl. No.: 14/932,401

(22) Filed: Nov. 4, 2015

(65) Prior Publication Data

US 2016/0056420 A1 Feb. 25, 2016

Related U.S. Application Data

(63) Continuation-in-part of application No. 13/761,527, filed on Feb. 7, 2013.

(Continued)

(51) Int. Cl.
*H01M 4/04* (2006.01)
*H01M 4/66* (2006.01)
(Continued)

(52) U.S. Cl.
CPC ....... *H01M 4/0404* (2013.01); *H01M 4/0435* (2013.01); *H01M 4/661* (2013.01);
(Continued)

(58) Field of Classification Search
CPC ........ H01M 4/043; H01M 4/661; H01M 4/04; H01M 4/64
(Continued)

(56) References Cited

U.S. PATENT DOCUMENTS

2003/0029333 A1 2/2003 Sato et al.
2004/0224235 A1 11/2004 Yanai et al.
(Continued)

FOREIGN PATENT DOCUMENTS

| CN | 2754223 Y | 1/2006 |
|---|---|---|
| CN | 1905245 A | 1/2007 |

(Continued)

OTHER PUBLICATIONS

Notice of Allowance dated Apr. 11, 2017, of the corresponding Korean Patent Application No. 10-2013-0022377.

(Continued)

*Primary Examiner* — Sean P Cullen
(74) *Attorney, Agent, or Firm* — Lee & Morse, P.C.

(57) ABSTRACT

A rechargeable battery and a method of manufacturing the same, the battery including an electrode assembly, the electrode assembly including a first electrode, a second electrode, and a separator between the first electrode and the second electrode; and a case accommodating the electrode assembly, wherein each of the first and second electrodes includes a coated region having an active material layer on a current collector and an uncoated region free of the active material layer, and in at least one electrode of the first and second electrodes, the current collector is characterized by an x-ray diffraction pattern in which a ratio of an intensity of a largest peak: an intensity of a second largest peak of the current collector in the uncoated region is greater than a ratio of an intensity of a largest peak: an intensity of a second largest peak of the current collector in the coated region.

6 Claims, 14 Drawing Sheets

Related U.S. Application Data

(60) Provisional application No. 61/608,281, filed on Mar. 8, 2012.

(51) Int. Cl.
 *H01M 4/70* (2006.01)
 *H01M 4/02* (2006.01)

(52) U.S. Cl.
 CPC ........ *H01M 4/70* (2013.01); *H01M 2004/021* (2013.01); *H01M 2220/20* (2013.01); *H01M 2220/30* (2013.01); *Y10T 29/49115* (2015.01)

(58) Field of Classification Search
 USPC .......................................... 429/245; 29/623.5
 See application file for complete search history.

(56) References Cited

U.S. PATENT DOCUMENTS

| | | |
|---|---|---|
| 2005/0233222 A1 | 10/2005 | Yanagida et al. |
| 2007/0026307 A1 | 2/2007 | Kim |
| 2008/0233476 A1 | 9/2008 | Jeong |
| 2009/0061326 A1* | 3/2009 | Hirose ................ H01M 2/0257 429/338 |
| 2011/0039138 A1 | 2/2011 | Jeong et al. |
| 2011/0052954 A1 | 3/2011 | Fujiwara et al. |
| 2012/0045689 A1 | 2/2012 | Okabe et al. |
| 2012/0164530 A1 | 6/2012 | Temmyo et al. |
| 2012/0222742 A1 | 9/2012 | Nakagawa et al. |
| 2012/0231374 A1 | 9/2012 | Iseki et al. |
| 2013/0048340 A1* | 2/2013 | Bando .................... H01G 11/22 174/126.2 |
| 2013/0153467 A1 | 6/2013 | Seki et al. |
| 2014/0114519 A1 | 4/2014 | Iwama et al. |
| 2015/0207177 A1 | 7/2015 | Ose et al. |

FOREIGN PATENT DOCUMENTS

| | | |
|---|---|---|
| EP | 1 249 880 A2 | 10/2002 |
| EP | 2 202 828 A1 | 6/2010 |
| EP | 2 239 806 A1 | 10/2010 |
| EP | 2 421 075 A2 | 2/2012 |
| JP | 06-297069 A | 10/1994 |
| JP | 2000-087292 A | 3/2000 |
| JP | 2002-313327 A | 10/2002 |
| JP | 2004-169103 A | 6/2004 |
| JP | 2007-273390 A | 10/2007 |
| JP | 2011-040371 A | 2/2011 |
| JP | 2012-064563 A | 3/2012 |
| JP | 2013-051040 A | 3/2013 |
| JP | 2013-030360 A | 7/2013 |
| KR | 2002-0080265 A | 10/2002 |
| KR | 10-0823198 B1 | 4/2008 |
| KR | 10-2010-0112548 A | 10/2010 |
| KR | 10-2010-0125044 A | 11/2010 |
| KR | 10-2011-0017761 A | 2/2011 |
| KR | 10-2012-0017399 A | 2/2012 |

OTHER PUBLICATIONS

Full width at half maximum, Wikipedia.com. http://en.wikipedica.org/wiki/Full_width_at_half_maximum (accessed: Apr. 16, 2015).
European Search Report dated Jul. 4, 2013—from EP 13 15 8449.
Japanese Notice of Allowance dated Jul. 4, 2017, of the corresponding Japanese Patent Application No. 2013-042964.
Korean Office Action dated Aug. 23, 2016 in corresponding Korean Patent Application No. 10-2013-0022377; Jeong.
European Office Action dated Oct. 6, 2016 in corresponding European Patent Application No. 13158449.2; Jeong.
Office Action dated Feb. 28, 2017, of the corresponding Japanese Patent Application No. 2013-042964.
Chinese Office Action dated Apr. 25, 2016 in Corresponding Chinese Patent Application No. 201310075097.8.

\* cited by examiner

RECHARGEABLE BATTERY AND METHOD OF MANUFACTURING THE SAME

CROSS-REFERENCE TO RELATED APPLICATION

This is a continuation-in-part application based on pending application Ser. No. 13/761,527, filed Feb. 7, 2013, the entire contents of which is hereby incorporated by reference.

The present application claims priority under 35 U.S.C. § 119(e) to U.S. Provisional Application No. 61/608,281, filed on Mar. 8, 2012, and entitled: "Electrode, Fabricating Method Thereof, And Rechargeable Battery," which is incorporated herein by reference in its entirety.

BACKGROUND

1. Field

Embodiments relate to a rechargeable battery and a method of manufacturing the same.

2. Description of the Related Art

Unlike a primary battery that is incapable of being recharged, a rechargeable battery may be repeatedly charged and discharged. A low-capacity rechargeable battery may be used for a small portable electronic device, e.g., a mobile phone, a laptop computer, and/or a camcorder. A large-capacity battery may be used as a power supply for, e.g., driving a motor of a hybrid vehicle or the like.

A large-capacity and high power rechargeable battery using a non-aqueous electrolyte of high energy density has been considered. The high power rechargeable batteries may be connected to each other in series or in parallel to configure a high power and large capacity battery module.

The rechargeable battery may include an electrode assembly including a positive electrode, a negative electrode, and a separator interposed between the positive electrode and the negative electrode. The positive electrode and the negative electrode may each have a structure in which an active material is coated on a current collector formed of metal, and on the current collector, a coated region coated with the active material and an uncoated region without the active material are formed.

The above information disclosed in this Background section is only for enhancement of understanding of the background of the described technology and therefore it may contain information that does not form the prior art that is already known in this country to a person of ordinary skill in the art.

SUMMARY

Embodiments are directed to a rechargeable battery and a method of manufacturing the same.

The embodiments may be realized by providing a rechargeable battery including an electrode assembly, the electrode assembly including a first electrode, a second electrode, and a separator between the first electrode and the second electrode; and a case accommodating the electrode assembly, wherein each of the first and second electrodes includes a coated region having an active material layer on a current collector and an uncoated region free of the active material layer, and in at least one electrode of the first and second electrodes, the current collector is characterized by an x-ray diffraction pattern in which a ratio of an intensity of a largest peak: an intensity of a second largest peak of the current collector in the uncoated region is greater than a ratio of an intensity of a largest peak: an intensity of a second largest peak of the current collector in the coated region:

The ratio of the intensity of the largest peak: the intensity of the second largest peak of the current collector in the uncoated region may be about 1.3 to about 1.6 times the ratio of the intensity of the largest peak: the intensity of the second largest peak of the current collector in the coated region.

In the at least one electrode, the current collector may be characterized by an x-ray diffraction pattern in which a ratio of an intensity of a largest peak: an intensity of a second largest peak of the current collector in the uncoated region is about 1.4 to about 2.0.

The current collector of the at least one electrode may have an average thickness in the uncoated region smaller than an average thickness thereof in the coated region.

In the at least one electrode, the average thickness of the current collector in the uncoated region may be about 80 to about 95% of the average thickness of the current collector in the coated region.

The current collector of each of the first electrode and the second electrode may be characterized by an x-ray diffraction pattern in which a ratio of an intensity of a largest peak: an intensity of a second largest peak of the current collector in the uncoated region is greater than a ratio of an intensity of a largest peak: an intensity of a second largest peak of the current collector in the coated region.

The uncoated regions of each of the electrodes may extend along a side end of the respective current collectors.

The embodiments may also be realized by providing a method of manufacturing a rechargeable battery, the method comprising preparing an electrode such that preparing the electrode includes coating an active material on a portion of a current collector to form a coated region and a preliminary uncoated region, the preliminary uncoated region extending along one side end of the current collector and being free of the active material; and vibration hammering the current collector in the preliminary uncoated region to form an uncoated region such that the current collector is characterized by an x-ray diffraction pattern in which a ratio of an intensity of a largest peak: an intensity of a second largest peak of the current collector in the uncoated region is greater than a ratio of an intensity of a largest peak: an intensity of a second largest peak of the current collector in the coated region.

The ratio of the intensity of the largest peak: the intensity of the second largest peak of the current collector in the uncoated region may be about 1.3 to about 1.6 times the ratio of the intensity of the largest peak: the intensity of the second largest peak of the current collector in the coated region.

The current collector may be characterized by an x-ray diffraction pattern in which a ratio of an intensity of a largest peak: an intensity of a second largest peak of the current collector in the uncoated region is about 1.4 to about 2.0.

The current collector may have an average thickness in the uncoated region smaller than an average thickness thereof in the coated region. The average thickness of the current collector in the uncoated region may be about 80 to about 95% of the average thickness of the current collector in the coated region.

The vibration hammering may include ultrasonic vibration hammering. The ultrasonic vibration hammering may include passing the preliminary uncoated region along an anvil, generating ultrasonic vibrations with an ultrasonic vibration generator, and striking the preliminary uncoated region with a horn that vibrates in response to the ultrasonic vibrations of the ultrasonic vibration generator. The anvil may have a cylindrical roller structure, and passing the preliminary uncoated region along the anvil may include rolling the preliminary uncoated region along the cylindrical roller.

The ultrasonic vibrations may have a frequency of about 8 to about 12 kHz, the horn may strike the preliminary uncoated region with a pressure of about 0.4 to about 0.8 MPa, and the preliminary uncoated region may be passed along the anvil at a speed of about 3 m/min to about 7 m/min.

The method may further include pressing the coated region between pressing rollers. Vibration hammering the current collector in the preliminary uncoated region may occur prior to pressing the coated region. Pressing the coated region may occur prior to vibration hammering the current collector in the preliminary uncoated region. The method may further include drying the active material.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
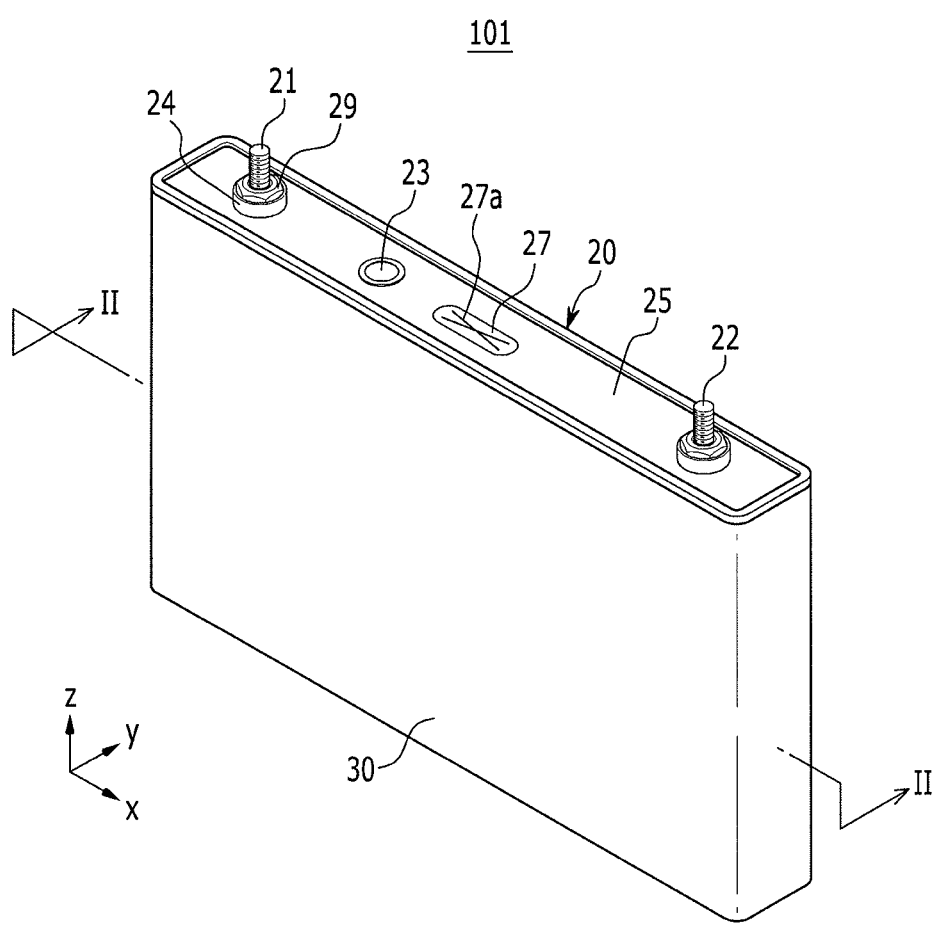
FIG. 1 illustrates a perspective view of a rechargeable battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may be present. In addition, it will also be understood that when an element is referred to as being "between" two elements, it can be the only element between the two elements, or one or more intervening elements may also be present. Like reference numerals refer to like elements throughout.

An embodiment provides an electrode applied to a positive electrode or a negative electrode of a rechargeable battery, the electrode including: a sheet type current collector and an active material layer coated on the current collector, in which the current collector includes a coated region (where the active material layer is formed) and an uncoated region (adjacent to the coated region and free of active material). The current collector in the uncoated region may have a thickness smaller than the current collector in the coated region.

Another embodiment provides a fabricating method of an electrode, including: vibration-hammering a preliminary uncoated region of a current collector (that includes a coated region where an active material layer is formed and the uncoated region free of active material).

Yet another embodiment provides a rechargeable battery, including: an electrode assembly including a first electrode and a second electrode; a case having a space housing the electrode assembly; and a cap plate covering an opening in the case. The first electrode may include a sheet type current collector and an active material layer coated on the current collector, the current collector including a coated region where the active material layer is formed and an uncoated region adjacent to the coated region and free of the active material layer. The current collector in the uncoated region may have a thickness smaller than the current collector in the coated region.

Figure 2:
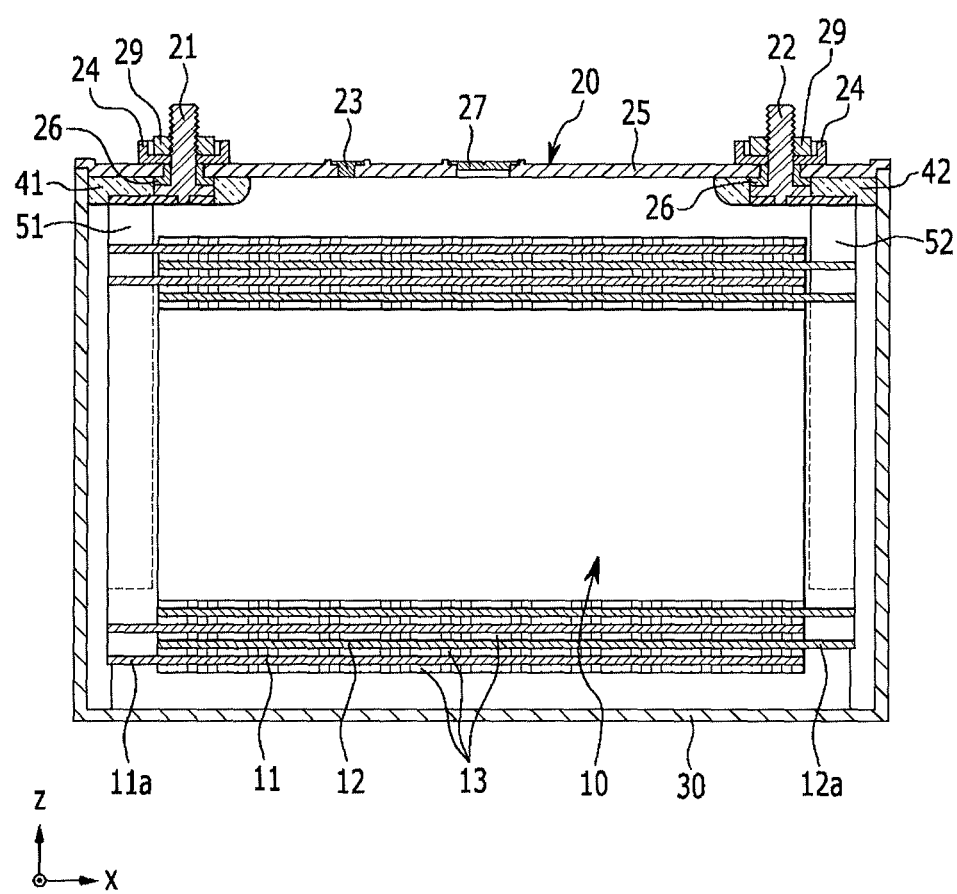
FIG. 2 illustrates a cross-sectional view taken along line II-II of FIG. 1.

FIG. 1 illustrates a perspective view of a rechargeable battery according to an embodiment. FIG. 2 illustrates a cross-sectional view taken along line II-II of FIG. 1.

Referring to FIGS. 1 and 2, a rechargeable battery 101 according to an embodiment may include an electrode assembly 10 wound with a separator 13 interposed between a positive electrode (first electrode) 11 and a negative electrode (second electrode) 12, a case 30 (in which the electrode assembly 10 is embedded or accommodated), and a cap plate 25 coupled with an opening of the case 30.

The rechargeable battery 101 according to the present embodiment will be described using a lithium ion rechargeable battery having a square or hexahedral shape as an example. However, the embodiments are not limited thereto, and may be applied to various types of batteries, e.g., a lithium polymer battery, a cylindrical battery, or the like.

Figure 3:
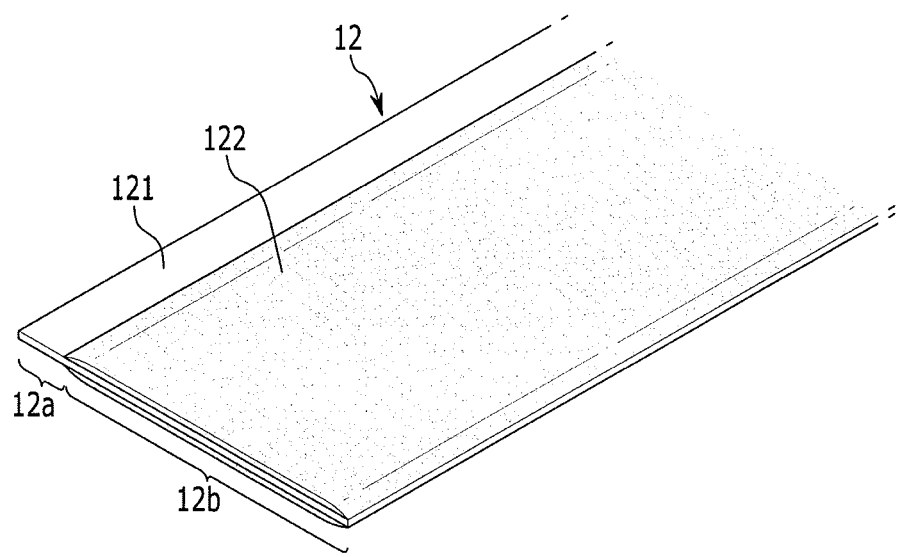
FIG. 3 illustrates a perspective view of a negative electrode according to an embodiment.
Figure 7:
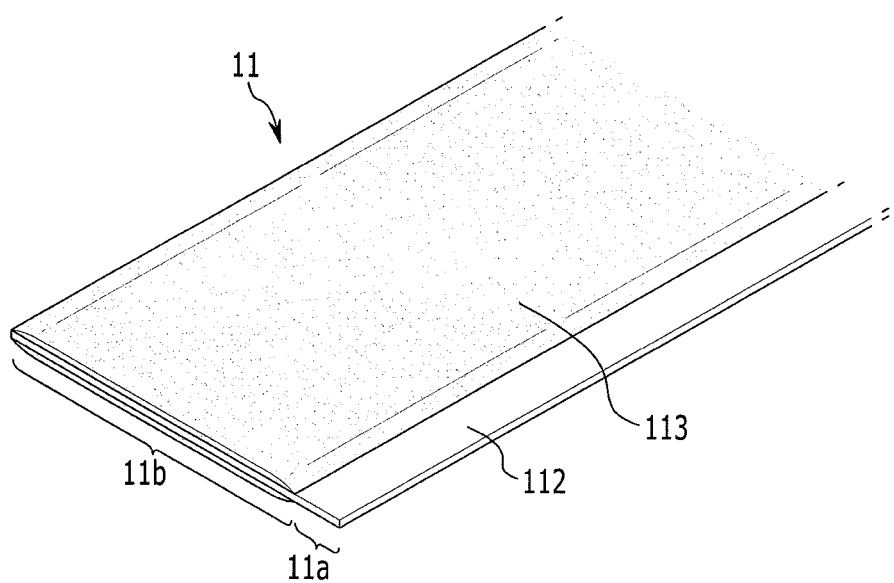
FIG. 7 illustrates a perspective view of a positive electrode according to an embodiment.

FIG. 3 illustrates a perspective view of a negative electrode according to an embodiment. FIG. 7 illustrates a perspective view of a positive electrode according to an embodiment.

As shown in FIGS. 3 and 7, the positive electrode 11 may include a positive current collector 112 (formed of, e.g., a thin metal foil) and a positive active material layer 113 (formed on the positive current collector 112). The negative electrode 12 may include a negative current collector 121 and a negative active material layer 122 formed on the negative current collector 121.

The positive current collector 112 may be formed in an elongated band shape and may include a positive coated region 11b (where the active material layer 113 is coated) and a positive uncoated region 11a (adjacent to the positive coated region 11b and free of active material). The negative current collector 121 may be formed in an elongated band shape and may include a negative coated region 12b (where the negative active material layer 122 is coated) and a negative uncoated region 12a (free of active material).

The positive uncoated region 11a may be formed on one side end of the positive current collector 112 along a lengthwise direction of the positive current collector 112. The negative uncoated region 12a may be formed on another side end of the negative current collector 121 along a lengthwise direction of the negative current collector 121.

The positive electrode 11 and the negative electrode 12 may be wound after a separator 13, e.g., an insulator, is interposed therebetween.

However, the embodiments are not limited thereto, and the electrode assembly may have a structure in which the positive electrode and the negative electrode (formed of a plurality of sheets) are stacked with the separator interposed therebetween.

The case 30 may have a substantially cuboid or hexahedral shape, and an opening may be formed at one surface or side thereof. The cap assembly 20 may include a cap plate 25 (covering the opening of the case 30), a positive terminal 21 (protruding outside the cap plate 25 and electrically connected to the positive electrode 11), a negative terminal 22 (protruding outside the cap plate 25 and electrically connected to the negative electrode 12), and a vent member 27 (having a notch 27a so as to be broken in response to a predetermined internal pressure).

The cap plate 25 may be formed of a thin metal plate and may be fixed to the case 30 at the opening thereof by, e.g., welding. An electrolyte injection opening (for injecting an electrolyte) may be formed at one side of the cap plate 25, and a sealing stopper 23 (that seals the electrolyte injection opening) may be fixed to the cap plate 25.

The positive terminal 21 may penetrate through the cap plate 25, and a first gasket 24 (disposed above) and a second gasket 26 (disposed below) may be installed between the cap plate 25 and the positive terminal 21 to insulate the cap plate 25 and the positive terminal 21.

The positive terminal 21 may have a cylindrical shape. A nut 29 (that supports the positive terminal 21 at an upper portion thereof) may be installed in the positive terminal 21, and a screw thread for coupling the nut 29 may be formed on an outer circumference of the positive terminal 21.

The positive terminal 21 may be electrically connected to the positive uncoated region 11a through a current collecting member 51 and a terminal flange (that supports the positive terminal 21 and the current collecting member 51) may be formed at a lower end of the positive terminal 21. Below the positive terminal 21, a lower insulating member 41 may insulate the positive terminal 21 and the cap plate 25.

The negative terminal 22 may penetrate through the cap plate 25, and a first gasket 24 (disposed above) and a second gasket 26 (disposed below) may be installed between the cap plate 25 and the negative terminal 22 to insulate the cap plate 25 and the negative terminal 22.

The negative terminal 22 may have a cylindrical shape. A nut 29 (that supports the negative terminal 22 at an upper portion thereof) may be installed in the negative terminal 22, and a screw thread for coupling the nut 29 may be formed on an outer circumference of the negative terminal 22.

The negative terminal 22 is electrically connected to the negative uncoated region 12a through a current collecting member 52 and a terminal flange (that supports the negative terminal 22 and the current collecting member 52) may be formed at a lower end of the negative terminal 22.

Below the negative terminal 22, a lower insulating member 42 may insulate the negative terminal 22 and the cap plate 25.

As shown in FIG. 3, the negative electrode 12 may include the negative current collector 121 and the negative active material layers 122 on surfaces of the negative current collector 121. For example, the negative current collector 121 may include a negative coated region 12b where active material is coated and a negative uncoated region 12a free of active material.

The negative current collector 121 may be formed of, e.g., copper or aluminum. The negative current collector 121 may have a plate shape that is elongated in one direction. The negative active material layer 122 may include, e.g., $Li_4Ti_5O_{12}$ or a carbon-based active material, a conductive agent, a binder, or the like. The negative active material layer 122 may be coated on the negative current collector 121 and attached by a lamination method.

Figure 4:
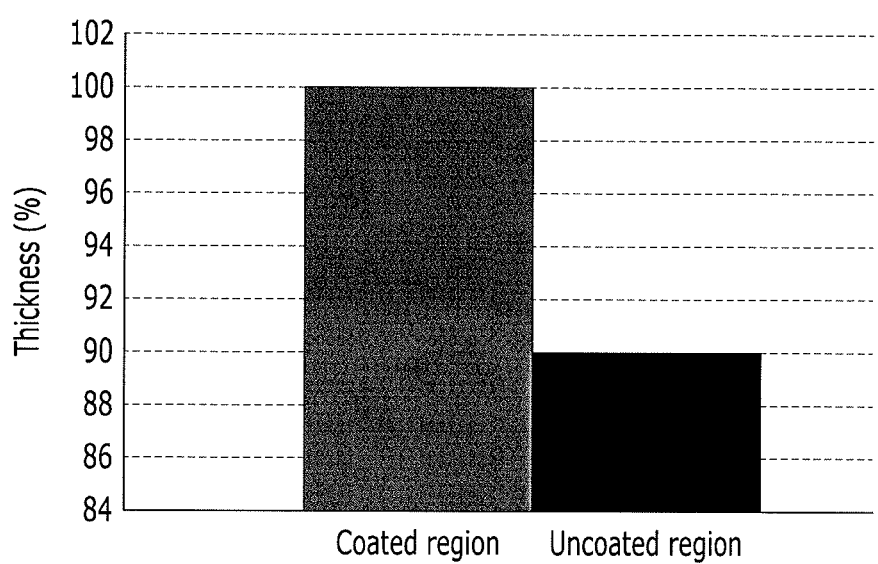
FIG. 4 illustrates a graph showing thicknesses of a negative coated region and a negative uncoated region according to an embodiment.

The negative uncoated region 12a may be stretched by hammering using vibrations. In an implementation, the negative uncoated region 12a may be stretched by hammering, e.g., using ultrasonic vibrations. As a result, as shown in FIG. 4, an average thickness of the negative current collector 121 in the negative uncoated region 12a may be smaller than that of the negative current collector 121 in the negative coated region 12b. For example, the average thickness of the negative current collector 121 in the negative uncoated region 12a may be about 80% to about 95% of that of the negative current collector 121 in the negative coated region 12b.

Figure 5:
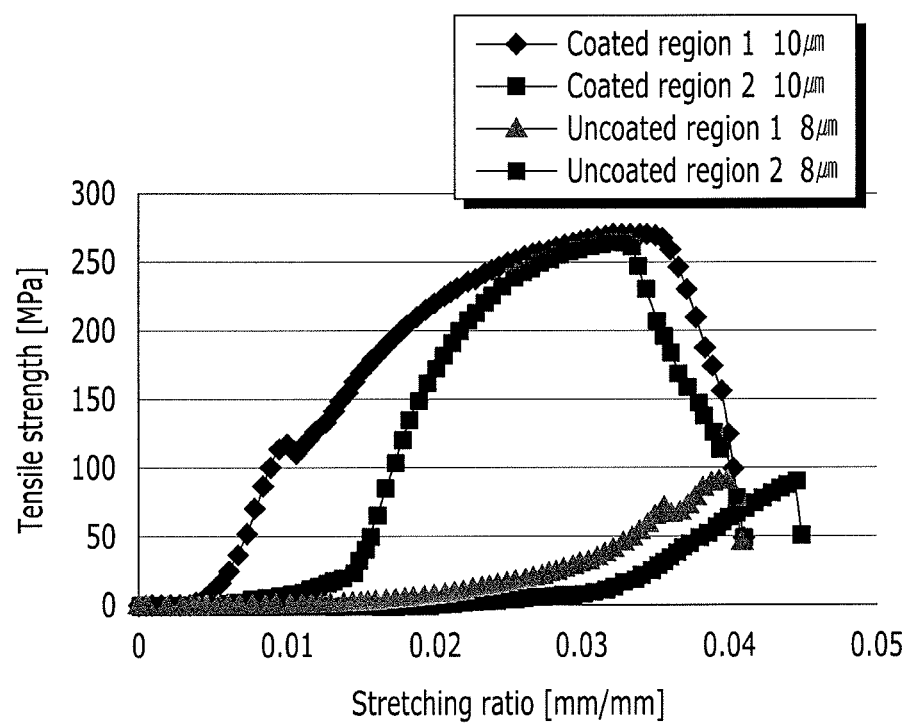
FIG. 5 illustrates a graph showing stretching ratios of a negative coated region and a negative uncoated region according to an embodiment.

As shown in FIG. 5, when the average thickness of the negative current collector 121 in the negative uncoated region 12a is smaller than that of the negative current collector 121 in the negative coated region 12b, a stretching ratio of the negative current collector 121 in the negative uncoated region 12a may be increased to be stretched more by a small force. Therefore, in the process of pressing the negative current collector 121 in the negative coated region 12b, the negative current collector 121 in the negative uncoated region 12a may also be naturally stretched, thereby preventing the negative electrode 12 from being curved.

Figure 6A:
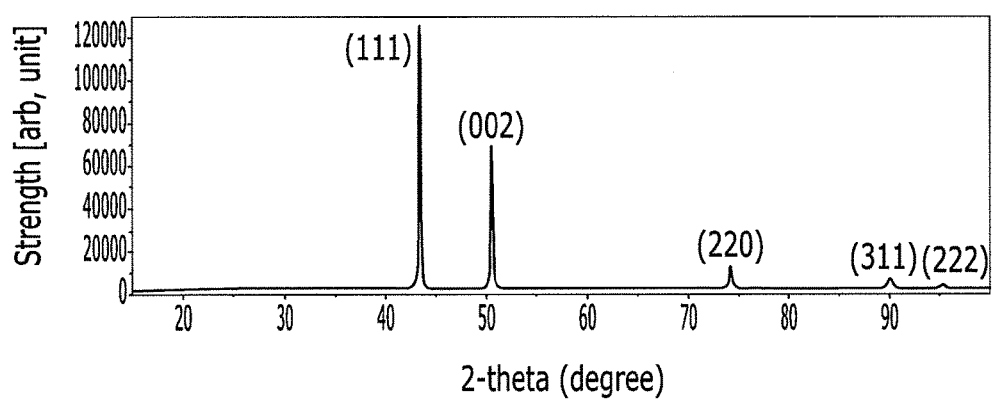
FIGS. 6A, 6B and 6C illustrate a graph showing an X-ray diffraction profile of a negative uncoated region according to an embodiment.
Figure 6B:
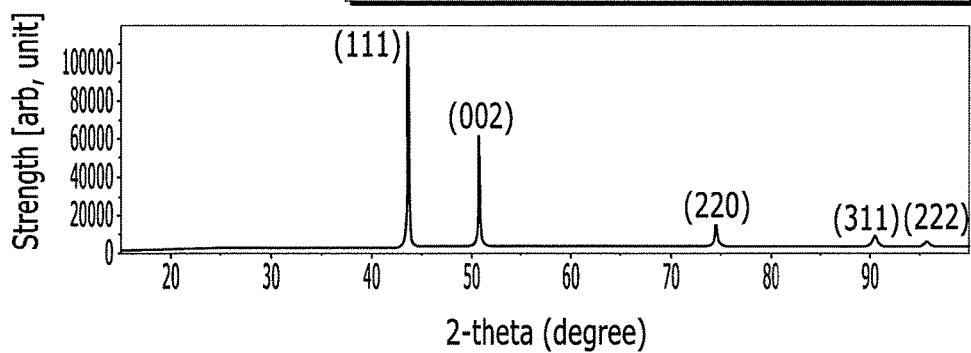
Figure 6C:
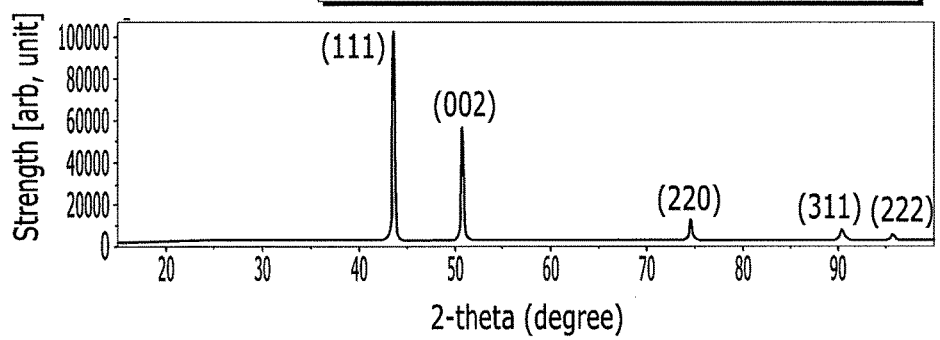
Figure 6D:
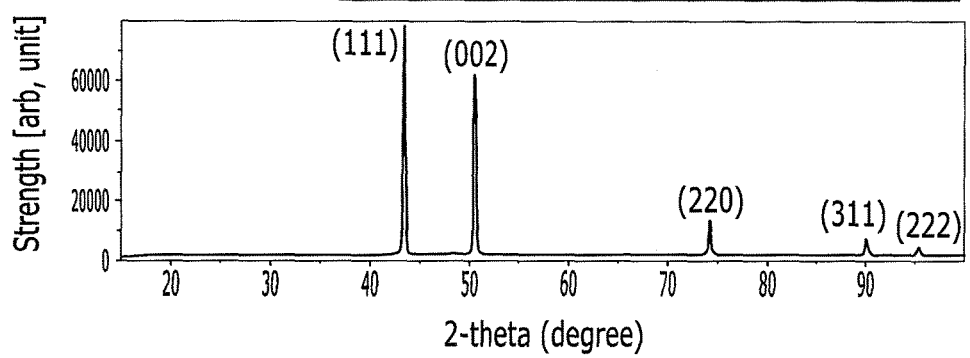
FIGS. 6D, 6E and 6F illustrate a graph showing an X-ray diffraction profile of a negative coated region according to an embodiment.
Figure 6E:
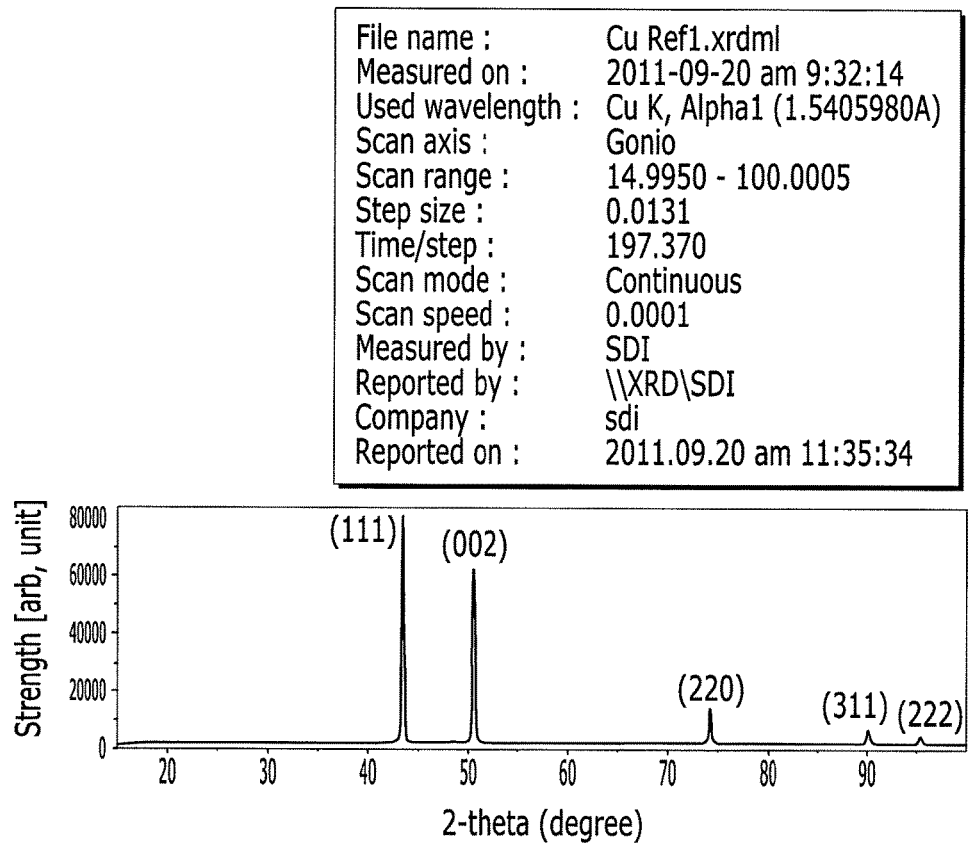
Figure 6F:
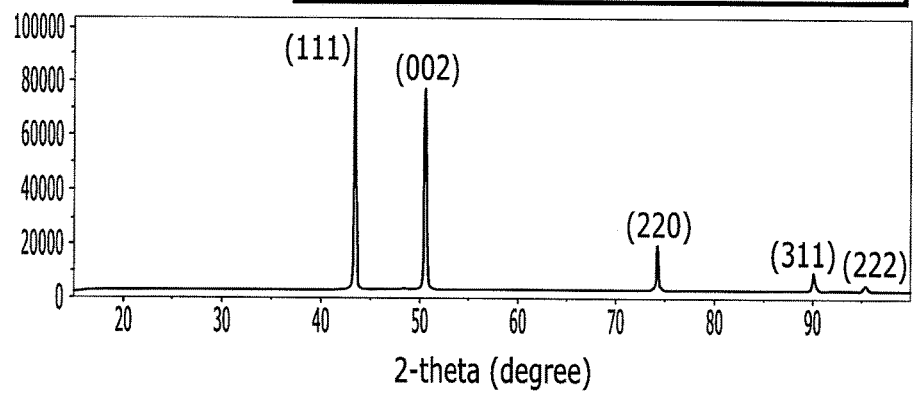

FIGS. 6A, 6B and 6C illustrate a graph showing an X-ray diffraction profile or pattern of a negative uncoated region according to an embodiment. FIGS. 6D, 6E and 6F illustrate a graph showing an X-ray diffraction profile or pattern of a negative coated region according to an embodiment.

FIGS. 6A to 6F show results of analyzing crystals of the negative current collector 121 in the negative uncoated region 12a and the negative coated region 12b by using X-ray diffraction after hammering the copper negative current collector 121 in the negative uncoated region 12a by using ultrasonic vibrations.

As shown in FIGS. 6A to 6F, it may be seen that a peak value of direction 111 and a peak value of direction 002 were reduced as a crystal orientation of the negative current collector 121 in the negative uncoated region 12a is changed by hammering using ultrasonic vibrations. This may be because the crystals become dense in the negative current collector 121 in the negative uncoated region 12a due to hammering using ultrasonic vibrations.

In the present embodiment, the negative current collector 121 made of copper is described as an example, and the peak values of directions 111 and 002 are exemplified. However, the embodiments are not limited thereto, and the peak value of direction 111 may correspond to the maximum peak value of an electrode substrate and the peak value of direction 002 may correspond to the second largest peak value of the electrode substrate.

TABLE 1

| I 111/I 002 | Coated region | Hammering-processed uncoated region |
|---|---|---|
| Sample 1 | 1.28 | 1.90 |
| Sample 2 | 1.32 | 1.87 |
| Sample 3 | 1.23 | 1.79 |
| Average | 1.28 | 1.85 |

Table 1 shows a comparison between the peak values of direction 111 and the peak values of direction 002, shown in FIGS. 6A to 6F of the negative current collector 121 in the negative uncoated region 12a and the negative coated region 12b.

In Table 1, the hammering (using ultrasonic vibrations) was performed with a frequency of 10 kHz at a pressure of 0.6 MPa and a moving speed of the negative current collector 121 was 5 m/min.

As shown in Table 1, an average ratio of the peak value of direction 111 to the peak value of direction 002 of the negative current collector 121 in the negative uncoated region 12a according to the present embodiment was 1.85. An average ratio of the peak value of direction 111 to the peak value of direction 002 of the negative current collector 121 in the negative coated region 12b was 1.28.

For example, both the peak values of direction 111 and direction 002 were reduced due to the hammering using ultrasonic vibrations, but the peak value of direction 002 was reduced to a greater degree.

A ratio of I 111/I 002 (i.e., a ratio of the peak value of direction 111 to the peak value of direction 002 of the negative current collector 121 in the negative uncoated region 12a) may be about 1.4 to about 2.0. Maintaining the ratio of I 111/I 002 at about 1.4 or greater may help ensure that the change in crystal orientation is sufficient, thereby preventing curving of the stretched negative uncoated region. Maintaining the ratio of I 111/I 002 at about 2.0 or less may help ensure that the change in crystal orientation is not too large, thereby preventing tearing of the negative uncoated region.

Further, in comparing the peak value ratios of the negative current collector 121 in the negative uncoated region 12a and the negative coated region 12b, the ratio of I 111/I 002 of the negative current collector 121 in the negative uncoated region 12a may be lager than the ratio of I 111/I 002 in the negative coated region 12b. When the ratio of the maximum peak value: the second largest peak value of the negative current collector 121 in the negative uncoated region 12a is increased (e.g., due to a change in crystal orientation), a length of the negative current collector 121 in the negative uncoated region 12a may be increased, and the stretching ratio is increased in a lengthwise direction of the negative current collector 121 in the negative uncoated region 12a, thereby preventing the negative electrode from being curved.

The ratio of I 111/I 002 of the negative current collector 121 in the negative uncoated region 12a may be about 1.3 to about 1.6 times the ratio of I 111/I 002 of the negative current collector 121 in the negative coated region 12b.

One method of increasing the stretching ratio of the negative current collector in the uncoated region is to perform an annealing process. If the annealing is performed to increase the stretching ratio, an oxide film may be formed on a surface of the negative current collector in the uncoated region during heat treatment, leading to an undesirable increase in resistance. For example, in the case of copper, an oxide film may be easily formed due to some moisture or a rise in temperature under a general atmospheric condition. Thus, the oxide film formed as above may be eluted inside the rechargeable battery and thus may serve as a by-product during charging and discharging, which may adversely affect a cycle-life, safety, and the like. Further, in the annealing, when a substrate, e.g., an electrolytic copper foil with little internal stress, is used, a physical property thereof may not be changed and thus it may be difficult to prevent an electrode from being curved.

Another method of stretching the negative current collector in the uncoated region is to roll using a roller. However, when rolling with the roller, a crack may be generated due to a stretching deviation on a boundary surface between a rolled portion and a non-rolled portion. As a result, a current path may be disconnected. Furthermore, when rolling even the coated region, a mixture density may be changed and thus the active material may be eliminated. In addition, an ultra high pressure hydraulic cylinder may be required for rolling, and it may be difficult to control a pressure of the hydraulic cylinder.

According to the embodiments, when the hammering using ultrasonic vibrations is applied, the negative current collector in the uncoated region may be intermittently stretched by minute impact, thereby preventing the undesirable generation of a crack. In addition, the negative current collector in the uncoated region may be stretched and simultaneously, a stretching ratio of the negative current collector in the uncoated region may be increased, thereby preventing the electrode from being curved.

Referring to FIG. 7, the positive electrode 11 according to an embodiment may include the positive current collector 112 and the positive active material layer 113 on surfaces of the positive current collector 112. For example, the positive current collector 112 may include the positive coated region 11b (where an active material is coated) and the positive uncoated region 11a (free of active material).

The positive current collector 112 may be formed of, e.g., aluminum, and may have a plate shape that is elongated in one direction. The positive active material layer may include, e.g., $LiCoO_2$, $LiMnO_2$, $LiNiO_2$, or the like, a conductive agent, a binder, or the like. The positive active material layer 113 may be coated on the positive current collector 112 or may be attached by a lamination method.

The positive current collector 112 in the positive uncoated region 11a may be stretched by hammering using ultrasonic vibrations. As a result, an average thickness of the positive current collector 112 in the positive uncoated region 11a may be smaller than an average thickness of the positive current collector 112 in the positive coated region 11b.

A thickness of the positive current collector 112 in the positive uncoated region 11a may be about 80% to about 95% of the thickness of the positive current collector 112 in the positive coated region 11b.

As the crystal orientation of the positive uncoated region 11a is changed by the hammering using ultrasonic vibration, a maximum peak value and a second largest peak value (according to X-ray diffraction analysis) of the positive current collector 112 in the positive uncoated region 11a may be smaller than a maximum peak value and a second largest peak value (according to the X-ray diffraction analysis) of the positive current collector 112 in the positive coated region 11b.

For example, a ratio of (maximum peak value)/(second largest peak value) of the positive current collector 112 in the positive uncoated region 11a may be larger than a ratio of (maximum peak value):(second largest peak value) of the positive current collector 112 in the positive coated region 11b. The ratio of (maximum peak value)/(second largest peak value) of the positive current collector 112 in the positive uncoated region 11a may be about 1.3 to about 1.6 times the ratio of (maximum peak value):(second largest peak) of the positive current collector 112 in the positive coated region 11b due to hammering using ultrasonic vibrations.

When the ratio of the maximum peak value and the second largest peak value of the positive current collector 112 in the positive uncoated region 11a is increased (e.g., due to a change in crystal orientation), a length of the positive uncoated region 11a may be increased, and a stretching ratio may be increased in a lengthwise direction of the positive uncoated region 11a, thereby helping to prevent the negative electrode from being curved.

In an implementation, in the positive current collector 112 in the positive uncoated region 11a, the ratio of (maximum peak value)/(second largest peak value), e.g., a ratio of the maximum peak value and the second largest peak value of the positive current collector 112 in the positive uncoated region 11a, may be about 1.4 to about 2.0.

As described above, when the positive current collector 112 in the positive uncoated region is hammered using ultrasonic vibrations, the crystal orientation of the positive current collector 112 in the positive uncoated region may be changed, thereby helping to prevent the positive electrode from being curved in the process of rolling or pressing the positive coated region.

Figure 8:
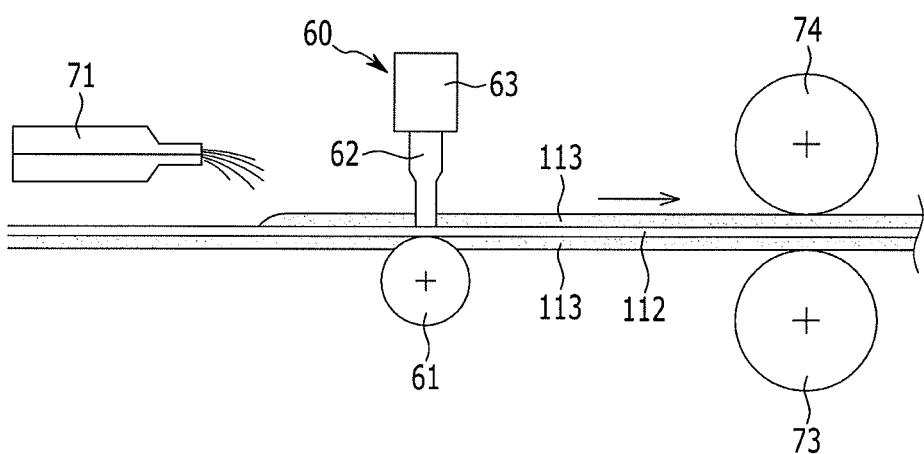
FIG. 8 illustrates a diagram showing a fabricating method of an electrode according to an embodiment.

FIG. 8 illustrates a diagram showing a fabricating method of an electrode according to an embodiment.

In FIG. 8, a positive electrode is described as an example, but the embodiments are not limited thereto, and a negative electrode may fabricated by the same method.

A fabrication method of a positive electrode according to an embodiment may include a step of forming a positive active material layer 113 on a positive current collector 112, a step of vibration-hammering a preliminary positive uncoated region (free of the positive active material layer 113) to form a positive uncoated region 11a, and a step of pressing a coated region (where the positive active material layer 113 is coated).

In the step of forming the positive active material layer 113, the positive active material layer 113 may be formed on a part of the positive current collector 112 by using a coater 71 discharging an active material. The positive active material layer 113 may be simultaneously formed on both surfaces of the positive current collector 112. Or as shown in FIG. 8, after the positive active material layer 113 is formed on one surface of the positive current collector 112, the positive active material layer 113 may be sequentially formed on the other surface.

In the vibration-hammering step, the preliminary positive uncoated region may be hammered by using an ultrasonic vibration hammering device 60 to form the positive uncoated region 11a. The ultrasonic vibration hammering device 60 may include an anvil 61 having a cylindrical roller structure, a horn 62 hammering the preliminary positive uncoated region, that moves on the anvil 61, using ultrasonic vibrations, and an ultrasonic vibration generator 63 applying ultrasonic vibrations to the horn 62.

The preliminary positive uncoated region may move on the rotating anvil 61 and the horn 62 may vibration-hammer the preliminary positive uncoated region vertically while vibrating at an ultrasonic wave frequency. When the positive current collector 112 moves while being hammered, hammering using ultrasonic vibrations may be continuously performed and in this process, the positive uncoated region 11a may be formed and stretched.

In an implementation, the ultrasonic vibrations may have a frequency of about 8 to about 12 kHz. In an implementation, the horn 62 may strike the preliminary uncoated region with a pressure of about 0.4 to about 0.8 MPa. In an implementation, the preliminary uncoated region may be passed along the anvil 61 at a speed of about 3 m/min to about 7 m/min.

In the pressing step, the positive coated region 11b may be pressed using pressing rollers 73 and 74 and during the pressing process, the positive coated region 11b may be stretched. As the positive coated region 11b is stretched, the positive uncoated region 11a may be stretched together therewith. The ultrasonic vibration hammering processed positive uncoated region 11a may be easily stretched even by a small force. Thus, the positive electrode may be prevented from being curved.

Figure 9:
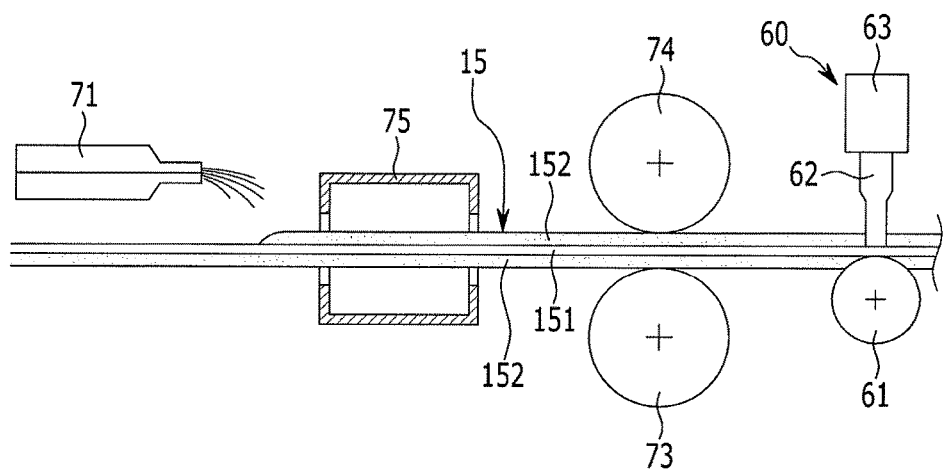
FIG. 9 illustrates a diagram showing a fabricating method of an electrode according to an embodiment.

FIG. 9 illustrates a diagram showing a fabricating method of an electrode according to an embodiment.

Referring to FIG. 9, a fabricating method of an electrode according to an embodiment will be described. In the present embodiment, an electrode 15 may refer to a positive electrode or a negative electrode that are applied to a rechargeable battery.

The fabricating method of the electrode 15 according to the present embodiment may include a step of forming an active material layer 152 on a current collector 151, a step of drying an electrode where the active material layer 152 is formed, a step of pressing a coated region (where the active material layer 152 is coated), and a step of vibration-hammering a preliminary uncoated region (free of the active material layer 152) to form the uncoated region.

In the step of forming the active material layer 152, the active material layer 152 may be formed on a part of the current collector 151 by using a coater discharging an active material. The active material layer 152 may be simultaneously formed on both surfaces of the current collector 151. Or as shown in FIG. 9, after the active material layer 152 is formed on one surface of the current collector 151, the active material layer 152 may be sequentially formed on the other surface.

In the drying step, the electrode 15 may be moved into a drying path 75 to dry a volatile liquid remaining inside the active material layer.

In the pressing step, the coated region may be pressed using pressing rollers 73 and 74 and during the pressing process, the coated region may be stretched. As the coated region is stretched, tensile stress may be applied to the preliminary uncoated region.

In the vibration-hammering step, after the pressing step, the preliminary uncoated region may be hammered using an ultrasonic vibration hammering device 60. The ultrasonic vibration hammering device 60 may include an anvil 61 having a cylindrical roller structure, a horn 62 hammering the preliminary uncoated region, that moves on the anvil 61, using ultrasonic vibrations, and an ultrasonic vibration generator 63 applying ultrasonic vibrations to the horn 62.

The preliminary uncoated region may move on the rotating anvil 61, and the horn 62 may vibration-hammer the preliminary uncoated region vertically while vibrating at an ultrasonic wave frequency. When the current collector 112 moves while being hammered, hammering using ultrasonic vibrations may be continuously performed. In this process, the preliminary uncoated region may be stretched to form the uncoated region and thus tensile stress applied to the uncoated region may be removed.

In an implementation, the ultrasonic vibrations may have a frequency of about 8 to about 12 kHz. In an implementation, the horn 62 may strike the preliminary uncoated region with a pressure of about 0.4 to about 0.8 MPa. In an implementation, the preliminary uncoated region may be passed along the anvil 61 at a speed of about 3 m/min to about 7 m/min.

In the present embodiment, the vibration-hammering step may be performed after the pressing step, but the embodiments are not limited thereto. For example, the vibration-hammering step may be performed together with the pressing step.

By way of summation and review, after being coated with the active material, the positive electrode and the negative electrode may be pressed flatly by a press or the like. The coated region may be pressed by the press to be stretched, but the uncoated region may hardly receive any pressing force and thus may not be stretched. As described above, when stretching ratios of the coated region and the uncoated region are different from each other, the electrode may warp. If the electrode warps, an error may occur in the process of winding the electrode (that is elongated in one direction), leading to a reduction in productivity and charging and discharging efficiency.

The embodiments provide a rechargeable battery including an electrode in which undesirable curvature thereof is reduced and/or prevented.

According to an embodiment, the current collector in the uncoated region may be vibration-hammered to be stretched, and a stretching ratio of the current collector in the uncoated region may be increased, thereby preventing the electrode from warping.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly, the electrode assembly including:
a first electrode,
a second electrode, and
a separator between the first electrode and the second electrode; and
a case accommodating the electrode assembly,
wherein:
each of the first and second electrodes includes a coated region having an active material layer on a current collector and an uncoated region free of the active material layer,
in at least one electrode of the first and second electrodes, the current collector is characterized by an x-ray diffraction pattern in which a ratio of an intensity of a largest peak:an intensity of a second largest peak of the current collector in the uncoated region is greater than a ratio of an intensity of a largest peak:an intensity of a second largest peak of the current collector in the coated region, and
in the at least one electrode, an average thickness of the current collector in the uncoated region is smaller than an average thickness of the current collector in the coated region such that the average thickness of the current collector in the uncoated region is about 80 to 95% of the average thickness of the current collector in the coated region.

2. The rechargeable battery as claimed in claim 1, wherein each uncoated region of each of the electrodes extends along a side end, respectively, of the current collector.

3. The rechargeable battery as claimed in claim 1, wherein:
the largest peak is a 111 peak, and
the second largest peak is a 002 peak.

4. The rechargeable battery as claimed in claim 1, wherein the ratio of the intensity of the largest peak: the intensity of the second largest peak of the current collector in the uncoated region is about 1.3 to about 1.6 times the ratio of the intensity of the largest peak: the intensity of the second largest peak of the current collector in the coated region.

5. The rechargeable battery as claimed in claim 1, wherein, in the at least one electrode, the x-ray diffraction pattern of the current collector has the ratio of the intensity of the largest peak: the intensity of the second largest peak of about 1.4 to about 2.0 in the uncoated region.

6. The rechargeable battery as claimed in claim 1, wherein the current collector of each of the first electrode and the second electrode is characterized by the x-ray diffraction pattern in which the ratio of the intensity of the largest peak: the intensity of the second largest peak of the current collector in the uncoated region is greater than the ratio of the intensity of the largest peak: the intensity of the second largest peak of the current collector in the coated region.

* * * * *